United States Patent [19]

Tebbe

[11] Patent Number: 4,687,087
[45] Date of Patent: Aug. 18, 1987

[54] TORSIONAL VIBRATION DAMPER

[75] Inventor: Gerhard Tebbe, Geldersheim, Fed. Rep. of Germany

[73] Assignee: Fichtel & Sachs AG, Schweinfurt, Fed. Rep. of Germany

[21] Appl. No.: 769,155

[22] Filed: Aug. 23, 1985

[30] Foreign Application Priority Data

Aug. 30, 1984 [DE] Fed. Rep. of Germany ....... 3431809

[51] Int. Cl.$^4$ .............................................. F16D 3/14
[52] U.S. Cl. .............................. 192/106.2; 192/106.1; 192/70.17
[58] Field of Search ............... 192/106.1, 106.2, 70.12, 192/70.19, 70.18, 70.17, 70.16; 464/68, 64

[56] References Cited

U.S. PATENT DOCUMENTS

| 3,091,949 | 6/1963 | Sink | 192/106.1 X |
| 3,931,876 | 1/1986 | Beeskow et al. | 192/106.2 |
| 4,493,408 | 1/1985 | Nagano | 192/106.2 X |
| 4,496,036 | 1/1985 | Loizeau | 192/70.17 X |
| 4,557,362 | 12/1985 | Nagano | 192/70.17 X |
| 4,563,165 | 1/1986 | Takeuchi | 192/106.2 X |
| 4,573,562 | 3/1986 | Deland | 192/106.2 |
| 4,577,743 | 3/1986 | Raab et al. | 192/106.2 |

FOREIGN PATENT DOCUMENTS

| 0096488 | 12/1983 | European Pat. Off. |
| 7228728 | 10/1973 | Fed. Rep. of Germany . |
| 2418062 | 10/1975 | Fed. Rep. of Germany . |
| 1200013 | 7/1970 | United Kingdom . |
| 1474566 | 5/1971 | United Kingdom . |
| 2111642 | 7/1983 | United Kingdom . |

Primary Examiner—William F. Pate, III
Assistant Examiner—Creighton Smith
Attorney, Agent, or Firm—Toren, McGeady & Associates

[57] ABSTRACT

The torsional vibration damper for the drive line of a motor vehicle driven by an internal combustion engine comprises two main parts (1, 3) rotatable in relation to one another about a common rotation axis, which are rotationally elastically coupled with one another through at least one pair of springs (7, 9) arranged in series-connection with one another. A friction damper device ($R_2$) stressable in the relative rotation of the main parts is connected in parallel with only one of the two springs (7, 9). A further friction damper device ($R_1$) with a smaller friction torque can be connected additionally in parallel with the series-connection of the two springs (7, 9). In such a torsional vibration damper the friction damping is independent of the torque basic loading and essentially dependent only upon the torque vibration superimposed on this torque basic loading. In this way characteristic resonances of the drive line of a motor vehicle can be damped in a deliberate manner.

9 Claims, 11 Drawing Figures

TORSIONAL VIBRATION DAMPER

BACKGROUND OF THE INVENTION

The invention relates to a torsional vibration damper particularly for damping torsional vibrations in the drive line of a motor vehicle, particularly for damping torsional vibrations between a crank shaft and a gear input shaft.

From German Utility Model No. 72 28 728 a torsional vibration damper for a clutch disc is known the under-load operation friction device of which is controlled by a control disc so that it becomes effective only after a pre-determined angle of rotation has been travelled. Thus the object is achieved that the friction of the torsional vibration damper is very slight in idling operation, while in operation under load it is comparatively great.

From German Patent No. 24 18 062 a torsional vibration damper is known of which the friction device dimensioned for operation under load is controlled by a control disc so that it has constant friction values, of different magnitudes however in the traction and thrust directions.

The invention is directed toward provision of a torsional vibration damper particularly for installation in the drive line of a motor vehicle driven by an internal combustion engine, which can be adapted better than hitherto to the torsional vibration characteristics of the drive line. More particularly the torsional vibration damper should be adaptable to operational conditions in which the internal combustion engine stimulates resonances at the characteristic frequency of which comparatively great torsional vibration amplitudes occur within the torsional vibration damper.

SUMMARY OF THE INVENTION

The torsional vibration damper according to the invention comprises two main parts rotatable in relation to one another about a common rotation axis, which are coupled rotationally elastically with one another by several springs, and also a friction damper device stressable in the relative rotation of the main parts. The improvement according to the invention consists in that the two main parts are coupled rotationally elastically with one another through at least one pair of springs arranged in series connection with one another. The friction damper device is here arranged in parallel connection with only one of the two springs of the pair. Such a torsional vibration damper has a torque-relative-rotation angle-characteristic at which the friction damping depends upon the vibration amplitude with which the two main parts vibrate in operation under load about a means or basic relative angle position of the two parts determined by the load torque. In operation under load the two main parts are rotated in relation to one another according to the torque characteristic, with stressing of the springs. If a torsional vibration of small amplitude is superimposed on this basic value, the friction damping of the torsional vibration damper according to the invention is also small. If on the other hand a great amplitude of vibration is superimposed, for example by stimulation of a characteristic frequency resonance, the friction damping is also great. In this way it is ensured that the friction damper device comes into use essentially only in the region of the characteristic frequencies of the drive line of a motor vehicle. Thus the life of the friction damper is lengthened and its heat generation is reduced. In the normal operational condition outside characteristic frequency resonance ranges, the friction damping is slight, whereby the friction damper is preserved.

In a preferred development of the invention a second friction damper device is provided the friction torque of which is less than that of the first-mentioned friction damper device. The second friction damper device is coupled directly between the two main parts and comes into use in all operational conditions at which the vibration amplitudes between the two main parts fall short of a predetermined value. The second friction damper device is thus effective only in the normal condition of operation.

In a further development of the invention an intermediate part is provided which on the one hand is a component of the friction damper device and on the other hand is connected with the springs coupling the main parts. The intermediate part is preferably subject to the action of the main part on the input side, in the case of use of the torsional vibration damper in a clutch disc this being the drive disc of the clutch disc, and thus loads only the springs in the case of torques smaller than the friction torque of the friction damper device. Thus it is ensured that the friction damper device comes into use only when the initial stress force of the springs loaded by the intermediate part exceeds the friction torque. In the case of torque fluctuations which do not exceed the friction torque of the said first friction damper device, only the second friction damper device, that is the friction damper device with the lower friction torque, becomes effective.

When the torsional vibration damper is used in clutch discs or axially divided flywheels of motor vehicle friction clutches, the main parts are formed by a hub disc and two side discs arranged axially on both sides of the hub disc. One of the side discs can be formed as engaging disc provided with clutch friction linings. The other side disc is formed as cover plate. In this case the intermediate disc is connected through first springs with the engaging disc and through second springs with the hub disc. The two spring systems can have equal or unequal spring rigidities. The springs are here seated in corresponding windows of these discs. By suitable dimensioning of the windows it is possible to achieve an angled spring characteristic curve. For better force distribution it is advantageous if the intermediate part consists of two preferably coinciding individual discs arranged symmetrically of the hub disc and connected nonrotatably with one another.

In another design of the torsional vibration damper it is provided that in the windows of the hub disc for the one part and of the cover plate or engaging disc for the other part in each case two springs are arranged one behind the other in series. The intermediate part comprises engaging parts or flanges which in each case engage between the end zones, facing one another, of the two springs. The two springs of each spring pair can have equal or different spring characteristics. With this design not only is it possible to make the magnitude of the friction damping dependent upon the magnitude of the vibration amplitude, but in addition in the range of low friction damping a different spring rigidity is achieved in traction operation and in thrust operation. In the case of pairing of springs of different spring rigidities the intermediate disc on loading in the one direction, for example the pulling direction, will firstly load the spring with higher rigidity, while in the other loading direction, that is in the thrust direction, firstly the spring with the lower spring rigidity, that is the flatter spring characteristic curve, is loaded.

In the design as explained above the intermediate disc can be provided with flanges which engage between the two springs of the spring pair. It is however also possible to provide two intermediate discs on the two sides of the hub disc, connected with one another through flanges or guide plates. The guide plates can simultaneously serve as connection elements which connect the two intermediate discs non-rotatably with one another.

The two friction damper devices as explained above are arranged preferably in the radially inner region of the discs of the torsional vibration damper. The friction damper devices are here expediently provided on opposite sides of the hub disc.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
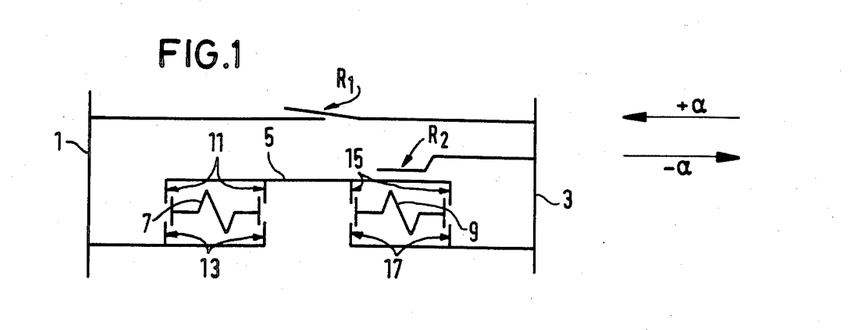
FIG. 1 shows a representation of principle of a first embodiment of a torsional vibration damper particularly for the drive line of a motor vehicle driven by an internal combustion engine.

FIG. 1 shows the representation of principle of a first embodiment of a vibration damper in accordance with the invention having two main parts 1, 3, explained in greater detail below and rotatable in relation to one another about a common rotation axis, in the drive line of a motor vehicle driven by an internal combustion engine. An intermediate part 5 is arranged rotatably about the common rotation axis in relation to the main parts 1, 3. The main parts 1, 3 are coupled rotationally elastically with one another through one or more pairs of series-connected springs 7, 9. The spring 7 of each spring pair is seated in corresponding windows 11, 13 of the intermediate part for the one part and of the main part 1 for the other part. The spring 9 of each spring pair is seated in corresponding windows 15, 17 of the intermediate part 5 for the one part and of the main part 3 for the other part. A first friction device $R_1$ acts directly between the two main parts 1, 3. The friction device $R_1$ is connected in parallel with the series-connection of the springs 7, 9. A second friction device $R_2$ acts between the intermediate part 5 and one of the main parts 1, 3, here the main part 3 serving as input part of the vibration damper. Thus the friction device $R_2$ is connected in parallel with only one of the two springs, here the spring 9. The friction devices $R_1$ and $R_2$ damp torsional vibrations of the two parts 1, 3 in relation to one another. The friction torque of the friction device $R_2$ is greater than the friction torque of the friction device $R_1$. If several pairs of springs 7, 9 are provided, the series-connections of the spring pairs are connected in parallel with one another.

Figure 2:
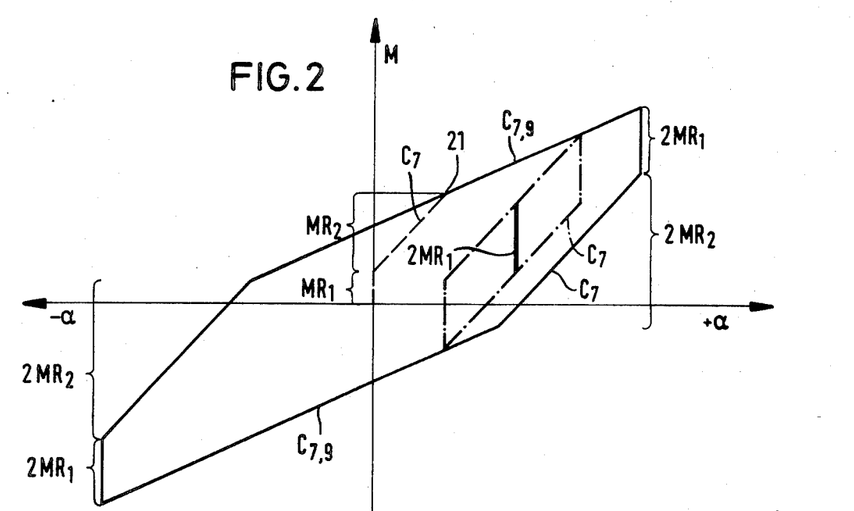
FIGS. 2 and 3 show diagrams which show the torque M transmitted by the torsional vibration damper in dependence upon the relative rotation angle $\alpha$ of the two main parts of a torsional vibration damper.
Figure 3:
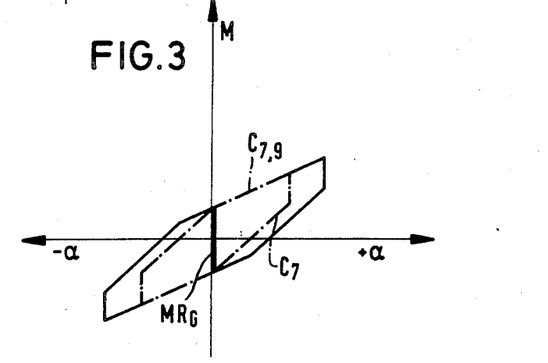

FIGS. 2 and 3 show torque characteristic curves of the torsional vibration damper according to FIG. 1. Positive values of the relative rotation angle $\alpha$ between the two main parts 1, 3 indicate the pulling direction, negative values the thrust direction. Let it be assumed that the main parts 1, 3 are loaded in the pulling direction with increasing torque, starting from the unloaded rest position. As FIG. 2 shows, a relative rotation of the main parts 1, 3 takes place only after the friction moment $MR_1$ of the friction device $R_1$ entered on the moment axis M is overcome. With further increasing torque the main part 3 is rotated in relation to the main part 1, the spring 7 being loaded through the friction device $R_2$ according to the spring characteristic curve $C_7$ entered in chain lines. The torque M increases in conformity with the spring characteristic curve $C_7$ until the torque exerted by the spring 7 has reached a value which corresponds to the torque $MR_2$ of the friction device $R_2$. At this point of the characteristic curve, represented at 21 in FIG. 2, the spring characteristic curve receives a kink, since as the rotation angle $\alpha$ increases further the torque is determined not only by the spring 7 but additionally also by the spring 9. A relative movement occurs between the intermediate part 5 and the main part 3. The torque characteristic curve now proceeds in accordance with the flatter spring characteristic curve $C_{7,9}$, since the two springs 7 and 9 are connected one behind the other. On reversal of movement from pulling direction to thrust direction the torque characteristic curve initially decreases by the value $2MR_1$, since the friction direction of the friction device $R_1$ reverses. With relative rotation angle increasing in the thrust direction, that is in the negative angle direction, the torque initially varies in accordance with the spring characteristic curve $C_7$, since initially the spring 7 is relieved. The torque decreases until it has reduced by twice the value of the friction torque of the friction device $R_2$, that is by $2MR_2$. On further relative rotation again the two springs 7, 9 are loaded in the thrust direction and the torque M varies in accordance with the spring characteristic curve $C_{7,9}$ of the series-connected springs 7, 9. The reversing movement from thrust operation into pulling operation takes place completely symmetrically. In the case of the curve represented in FIG. 2 in solid lines the torsional vibration damper is loaded between its two maximum relative rotation angles. At this maximum deflection of the two main parts 1, 3 the complete friction torque of the friction devices $R_1$, $R_2$ is available, which has the value $2MR_1$ in the end regions of the torque characteristic curve, is equal to the sum of $2MR_1$ and $2MR_2$ in the middle region and in the transition regions in accordance with the spring characteristic curve $C_7$ has the value $2MR_1$ increased by a proportion of $2MR_2$.

If the torque fluctuation in the drive line is less than at maximum deflection, the following conditions occur:

If the torque fluctuation is less than the friction torque $MR_2$ of the friction device $R_2$, a hysteresis behavior results in accordance with the line represented in dot-and-dash form in FIG. 2. Within this line the torque fluctuation proceeds on the spring characteristic curve $C_7$, since in this torque range only the spring 7 is subject to action, that is to say is stressed and released. In this torque range furthermore only the friction device $R_1$ is effective. The friction device $R_2$ is ineffective since the torque loading the spring 7 is less than the torque $MR_2$, or at most of equal value. The course of the torque fluctuation entered in dot-and-dash lines has, as shown by FIG. 2, a smaller vibration amplitude of the two parts 1, 3 in relation to one another, and at the same time the damping friction torque is reduced. It is here immaterial in which range of the torque limit characteristic curve the vibration occurs. In FIG. 2 the vibration characteristic curve in dot-and-dash lines designates a torsional vibration which is superimposed upon a basic loading in the pulling direction. FIG. 3 shows with a dot-and-dash line, within the torque limit characteristic curve represented by a solid line, a torque fluctuation about the rest position in which the torque loading is equally great in the pulling direction and in the thrust direction. The torque fluctuations are greater than the friction torque $MR_1$, but smaller than the torque at maximum possible deflection. Here again a part of the torque characteristic curve proceeds in accordance with the spring characteristic curve $C_7$, while another part proceeds in accordance with the spring characteristic curve $C_{7,9}$. The friction device $R_2$ comes into action on exceeding of the torque $MR_2$ (corresponding to point 21 in FIG. 2), and a kink occurs between the spring characteristic curve $C_7$ and the spring characteristic curve $C_{7,9}$. The friction moment to be overcome at this point has the value $MR_G$ and is composed of $2MR_1$ and a proportion $$= \frac{MR_2}{1 + C9/C7}.$$

The friction moment $MR_1$ of the friction device $R_1$ can be reduced to nearly zero. To this there corresponds in FIG. 2 a fluctuation of moments below the chain line spring characteristic curve $C_7$ on a line passing through the origin and corresponding to the characteristic curve $C_7$.

Figure 4:
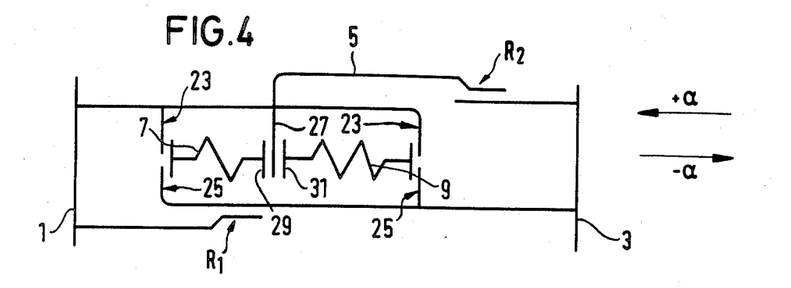
FIG. 4 shows a representation of principle of another embodiment of a torsional vibration damper.

FIG. 4 shows the principle of assembly of another embodiment of a torsional vibration damper according to the invention. For the sake of simplicity parts of like effect are characterized by the same reference numerals and symbols. To this extent reference is made to the description of FIGS. 1 to 3. The difference of the torsional vibration damper according to FIG. 4 from the torsional vibration damper according to FIG. 1 consists essentially in that the springs 7, 9 of the spring pair coupling the main parts 1, 3 rotationally elastically with one another are arranged connected behind one another in series in a common window 23 of the main part 1 for the one part and a common window 25 of the main part 3 for the other part, and in that the intermediate part 5 engages with an engaging part 27 between the mutually facing ends 29, 31 of the two springs 7, 9. The two springs 7, 9 of the spring pair can again have equal or different spring characteristic curves, and several such pairs of springs 7, 9 connected in series can be connected in parallel with one another. Between the main parts 1, 3 again a friction device $R_1$ is arranged which is connected in parallel with the series-connection of the springs 7, 9. A second friction device $R_2$ is connected in parallel with only one of the two springs, here the spring 9. The friction torque generated by the friction device $R_2$ is greater than the friction torque of the friction device $R_1$.

Figure 5:
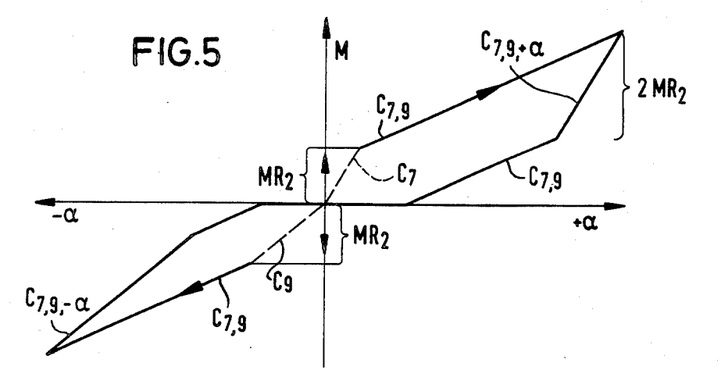
FIGS. 5 and 6 show diagrams showing the course of the torque M transmitted by the torsional vibration damper according to FIG. 4 in dependence upon the relative rotation angle $\alpha$ between its two main parts.

FIG. 5 shows the principle of the torque course of the torsional vibration damper according to FIG. 4 in the case of a negligibly small friction torque of the friction device $R_1$. Furthermore in FIG. 5 it is presumed that the springs 7, 9 are seated without initial stress in the windows 23, 25 and that the spring 7 has a steeper spring characteristic curve than the spring 9, that is to say is harder than the spring 9. On loading of the torsional vibration damper by a torque M the following torque characteristic results, starting from the unloaded condition:

On a loading in the pulling direction (positive values of $\alpha$) the torque M initially rises to a value $MR_2$, whereupon the two main parts 1, 3 rotate in relation to one another, without further torque increase, to a relative rotation angle $\alpha$ determined by the spring characteristic curve $C_7$. This behavior derives from the fact that in the torsional vibration damper according to FIG. 4 one of the two springs 7 or 9 remains in an initially stressed condition corresponding to the friction moment $MR_2$ of the friction device $R_2$. In FIG. 5 firstly the spring 7 is initially stressed by the friction moment $MR_2$. On further increase of the torque M the torque characteristic follows the spring characteristic curve $C_{7,9}$. The spring characteristic curve $C_{7,9}$ is flatter than the spring characteristic curve $C_7$, since now both springs 7 and 9 are effective. If the direction of rotation is reversed, that is the torsional vibration damper is stressed in the thrust direction (negative values of the angle $\alpha$), the torque M varies in accordance with the spring characteristic curve $C_{7,9+\alpha}$ by the value $2MR_2$. The spring characteristic curve $C_{7,9+\alpha}$ derives in the movement in the thrust direction from the fact that firstly the spring 7 is relaxed and then, after a torque jump of $2MR_2$, both springs 7 and 9 are again effective. If in the case of thrust loading the relative direction of rotation is reversed, the torque M follows another spring characteristic curve designated by $C_{7,9-\alpha}$. This characteristic curve has a course flatter than the characteristic curve $C_{7,9+\alpha}$, since in the case of thrust loading and transition from thrust direction to pulling direction firstly the spring 9 is relaxed and only then are the two springs 7, 9 again effective on their common spring characteristic curve $C_{7,9}$. Thus the configuration of the torsional vibration damper according to FIG. 4 permits generating spring characteristic curves of different steepnesses in the reversal zones of the torque characteristic curve.

Figure 6:
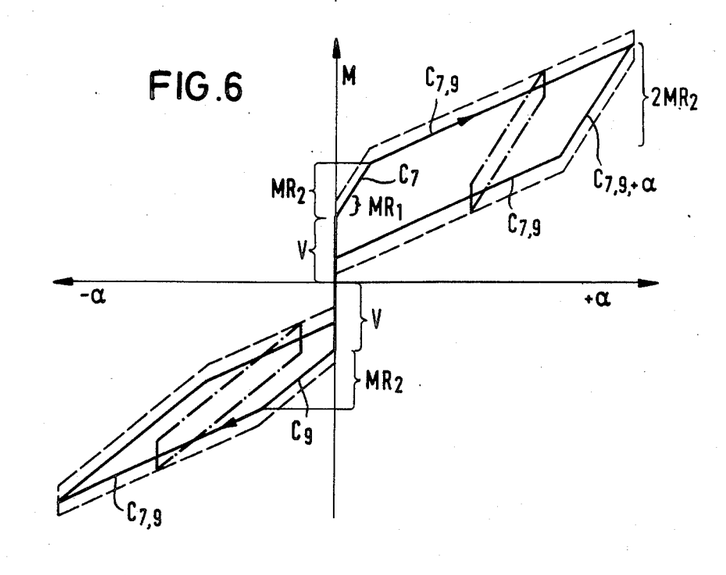

FIG. 6 shows the torque characteristic curve for the case where the springs 7 and 9 are inserted with an initial stress into the windows 23, 25. The initial stress varies the torque characteristic in the region of the rest position of the main parts 1, 3. Let it be assumed that the initial stress torque V is greater than the friction torque $MR_2$. Starting from the rest position, the torque M on loading in the pulling direction initially varies by the value of the initial stress torque V. On further increase of the torque M the moment varies according to FIG. 5. Firstly the spring 7 is initially stressed according to the value of the friction torque $MR_2$. Then the torque course, in accordance with the series-connection of the springs 7, 9, follows their common characteristic curve $C_{7,9}$. The reverse movement in the traction loading range takes place likewise initially on the characteristic curve $C_{7,9+\alpha}$ according to a value $2MR_2$. This is followed by the return movement to the rest position on the common characteristic curve $C_{7,9}$. At the transition into the thrust range (negative values of the angle $\alpha$) again firstly the initial stress torque V must be overcome before the torque course can follow the spring characteristic curve $C_9$ of the spring 9.

Here again the spring 9 is firstly stressed to a torque value $MR_2$, before both springs are loaded. As already described in connection with FIG. 5, the spring 9 has a flatter spring characteristic curve than the spring 7. On reversal of the direction of movement in thrust operation here again a flatter overall characteristic curve results than in the case of reversal in pulling operation.

FIG. 6 shows in a chain line the torque characteristic curve of the torsional vibration damper according to FIG. 4 in the case of a non-negligible friction torque $MR_1$ of the friction device $R_1$. The friction torque $MR_1$ is superimposed according to its sign upon the torque course illustrated in solid lines for the absence of friction torque $MR_1$. The torque course according to FIG. 5 varies in corresponding manner if the friction torque $MR_1$ of the friction device $R_1$ is not negligible.

FIGS. 5 and 6 show the limit characteristic curves at maximum relative rotation of the main parts 1, 3. In the case of a partial loading of the torsional vibration damper in pulling operation or in thrust operation, at which a torsional vibration with a comparatively small vibration amplitude is superimposed upon a basic value of the torque, the torque fluctuation follows the hysteresis curve entered in dot-and-dash lines as example in FIG. 6. Here let it be assumed that the torque fluctuation does not overcome the friction torque $MR_2$. The friction damping is thus determined by the friction torque $MR_1$ and is comparatively small. On an increase of the torsional vibration amplitude the friction torque $MR_2$ can be exceeded, as was explained with reference to FIGS. 2 and 3. In this way the friction torque can increase in accordance with the increase of the vibration amplitude to its maximum value $2MR_1+2MR_2$.

Figure 7:
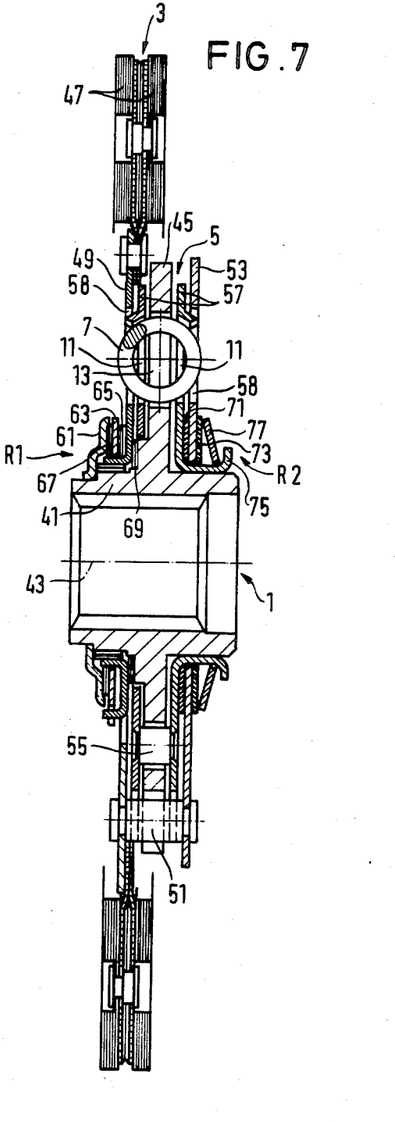
FIG. 7 shows an axial longitudinal section through a clutch disc for a motor vehicle friction clutch with a torsional vibration damper in accordance with the invention.
Figure 8:
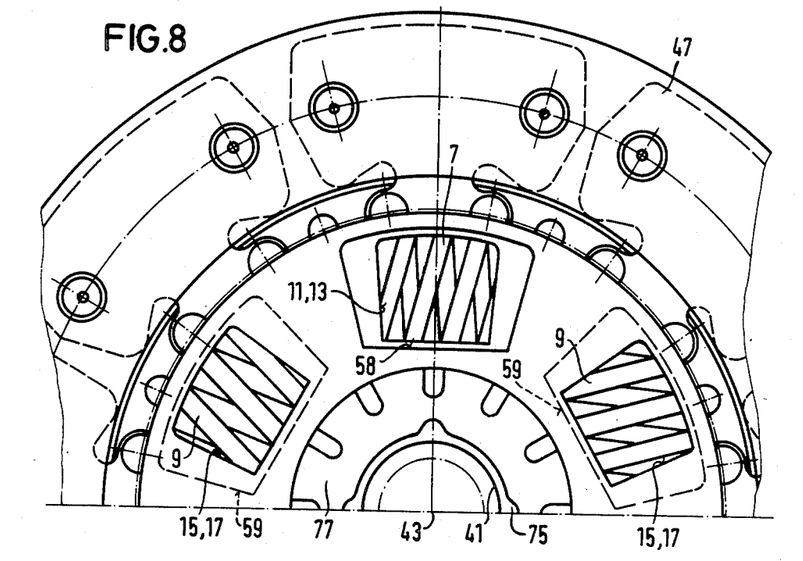
FIG. 8 shows a lateral elevation of the clutch disc according to FIG. 7.

FIGS. 7 and 8 show a clutch disc for a motor vehicle friction clutch with a torsional vibration damper according to FIG. 1. In FIGS. 7 and 8 parts of like function are designated with the reference numerals of FIG. 1. For explanation reference is made to the description of FIGS. 1 to 3. The main part 1 is formed as output part of the clutch disc and comprises a hub 41 which is to be coupled non-rotatably but axially displaceably with a gear input shaft (not illustrated further) rotatable about a rotation axis 43. From the hub 41 a hub disc 45 protrudes substantially radially. The main part 3 forms the input part and comprises an engaging disc 49, provided with clutch friction linings 47, on one axial side of the hub disc 45 and a cover disc 53, firmly connected through distance rivets 51 with the engaging disc 49, on the axially opposite side of the hub disc 45. The intermediate part 5 comprises two intermediate discs 57 connected with one another into one unit by distance rivets 55. One of these intermediate discs is arranged axially between the hub disc 45 and the engaging disc 49 and the other axially between the hub disc 45 and the cover disc 53.

The clutch disc comprises three springs 7 offset in relation to one another in the circumferential direction by 120°, which are seated substantially without play in windows 13 of the hub disc 45 and windows 11 of the two intermediate discs 57. The engaging disc 49 and the cover disc 53 are provided in the region of the springs 7 with apertures 58 in which the springs 7 engage in each case. The apertures 58 are of such large dimensions that the springs 7 can move freely in the apertures 58 in the entire relative rotation range. The clutch disc further comprises three springs 9 offset by 120° in relation to one another which penetrate the hub disc 45 in openings 59 and are held on both sides of the hub disc 45 substantially without play in windows 15 of the two intermediate discs 57 for the one part and windows 17 of the engaging disc 49 and of the cover disc 53 for the other part. The openings 59 are of such large dimensions that the springs 9 can move freely in these openings in the entire relative rotation angle range.

The friction units $R_1$ and $R_2$ are of conventional formation and arranged on axially mutually opposite sides of the hub disc 45 radially within the diameter circle on which the springs 7, 9 are arranged. The friction device $R_1$ comprises a side disc 61 secured on the hub 41 and a thrust disc 63 guided non-rotatably but axially displaceably on the engaging disc 49, axially between the side disc 61 and the engaging disc 49. The thrust disc 63 is pressed by an axially acting spring 65 through a friction ring 67 against the side disc. A further friction ring 69 is arranged between the engaging disc 49 and the hub disc 45. The friction device $R_2$ comprises a friction ring 71 between the adjacent intermediate disc 57 and the cover disc 53 and a further friction ring 73 on the other axial side of the cover disc 53. The intermediate disc 57 adjacent to the cover disc 53 carries an extension 75 extending axially outwards through the inner opening of the cover disc 53, against which extension there is supported a dished spring 77 generating the axial initial stress of the friction device $R_2$. The friction torque generated by the friction device $R_2$ is greater than the friction torque of the friction device $R_1$. For the explanation of the manner of operation of the torsional vibration damper of the clutch disc according to FIGS. 7 and 8 reference is made to the description of FIGS. 1 to 3.

Figure 9:
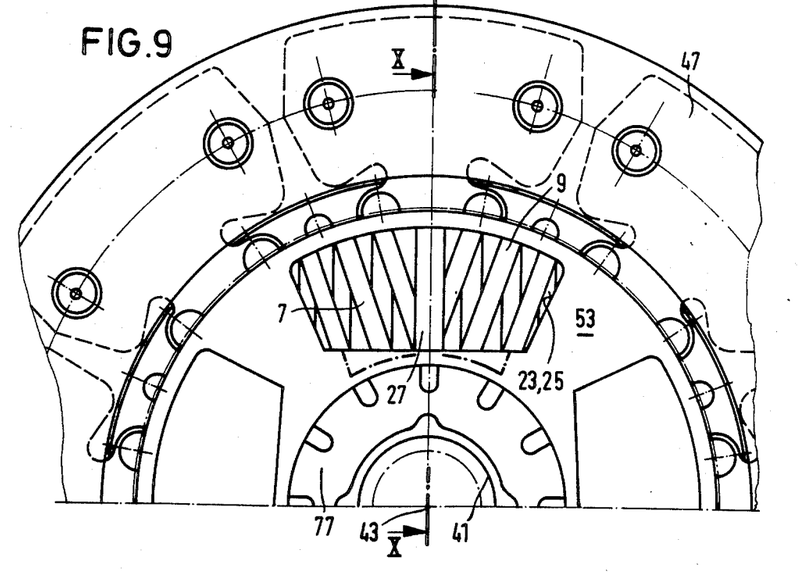
FIG. 9 shows a lateral elevation of a variant of the clutch disc according to FIG. 7.
Figure 10:
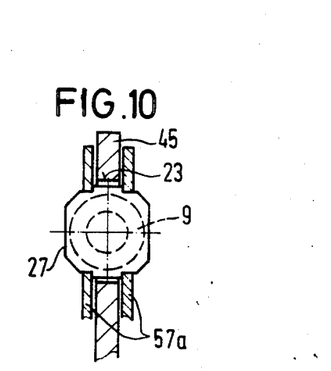
FIG. 10 shows a detail view of the clutch disc according to FIG. 9, seen along a line X—X.

FIGS. 9 and 10 in combination with FIG. 7 show a clutch disc for a motor vehicle friction clutch according to the illustration of principle of FIG. 4. Parts of like effect in FIGS. 9 and 10 are designated by the reference numerals of FIGS. 4 and 7. For explanation reference is made to the description of FIGS. 4 to 7. The clutch disc comprises four pairs of springs 7, 9 offset in the circumferential direction by 90° in relation to one another which are seated in the circumferential direction one behind the other in common windows 23, 25 of the hub discs 45 for the one part and of the engaging disc 49 and the cover disc 53 for the other part. The intermediate part 5 consists of two intermediate discs 57a axially on both sides of the hub disc 45. The intermediate discs 57a are connected by engaging flanges 27. The engaging flanges 27 engage between the springs 7, 9 through the windows 23 of the hub disc, the springs 7, 9 being supported on the engaging discs 27. The friction devices $R_1$ and $R_2$ are assembled in accordance with FIG. 7.

Figure 11:
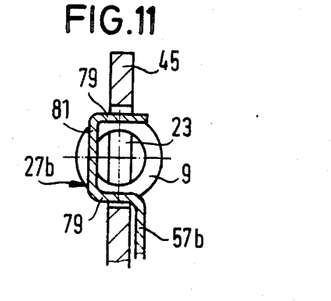
FIG. 11 shows a partial view of a variant of the clutch disc according to FIG. 9.

FIG. 11 shows a variant of the clutch disc according to FIGS. 9 and 10 which differs essentially only in that only one intermediate disc 57b forming the intermediate part 5 is provided, from the external circumference of which engaging flanges 27b protrude with two axial sections 79 extending with radial spacing from one another and a radial section 81 interconnecting the axial sections. The engaging flanges 27b again engage in the windows of the hub disc 45 and extend between the springs 7, 9.

In the torsional vibration dampers as explained above by suitable dimensioning of the windows it is possible to produce kinked individual spring characteristic curves. The torsional vibration damper does not have to be allocated to a clutch disc but can also be provided elsewhere within the drive line of the motor vehicle, for example between the two parts of an axially divided flywheel of an internal combustion engine.

While specific embodiments of the invention have been shown and described in detail to illustrate the application of the inventive principles, it will be understood that the invention may be embodied otherwise without departing from such principles.

I claim:

1. A torsional vibration damper, comprising
   (a) two main parts (1, 3) rotatable in relation to one another about a common axis of rotation,
   (b) at least one pair of springs (7, 9) arranged in series-connection with one another and coupling said two main parts (1, 3) rotationally elastically with one another,
   (c) a first friction damper device ($R_1$) and a second friction damper device ($R_V$),
   (d) an intermediate part (5) rotatable about the common rotation axis relative to said two main parts (1, 3) and said springs (7, 9) of the pair are supported on one another during the relative rotation of said two main parts (1, 3),
   (e) said first friction damper device ($R_1$) acts directly between said two main parts (1, 3) and is connected in parallel with the series connection with said at least one pair of springs (7, 9), said second friction damper device ($R_2$) acts between said intermediate part (5) and one of said main parts and is connected in parallel with only one of said springs, and said intermediate part (5) is coupled with the other one of said main parts only by means of the other of said two springs of said at least one pair.

2. A torsional vibration damper according claim 1, wherein one of the two main parts comprises a hub disc and the other of the two main parts comprises two side discs connected with one another to form a unit and arranged axially on both sides of the hub disc, wherein the intermediate part comprises at least one intermediate disc arranged axially between the hub disc and one of the side discs and rotatable in relation to the hub disc and the side discs, wherein a first spring of each spring pair is arranged in windows of the hub disc and of the intermediate disc and is stressable in the relative rotation of the hub disc and the intermediate disc and wherein a second spring of each spring pair is arranged in windows of the side discs and the intermediate disc and is stressable in the relative rotation of the side discs and the intermediate disc.

3. A torsional vibration damper according to claim 1, wherein one of the two main parts comprises a hub disc and the other of the two main parts comprises two side discs arranged axially on both sides of the hub disc and connected with one another to form one unit, wherein the intermediate part comprises at least one intermediate disc arranged axially between the hub disc and one of the side discs and rotatable in relation to the hub disc and the side discs, wherein the springs of the spring pair are seated in the circumferential direction one behind the other in common windows of the hub disc and of the side discs and wherein the intermediate disc comprises at least one engaging part grasping between the springs of the spring pair.

4. A torsional vibration damper according to claim 3, wherein one single intermediate disc is provided and wherein the engaging part comprises two sections engaging with radial spacing from one another in the axial direction through the window, receiving the spring pair, of the hub disc, said sections being connected with one another by a radial section.

5. A torsional vibration damper according to claim 3, wherein the intermediate part comprises two intermediate discs arranged on axially opposite sides of the hub disc and wherein the engaging part passes through the window of the hub disc between the springs of the spring pair and connects the two intermediate discs.

6. A torsional vibration damper according to claim 1, wherein one of the main parts is formed by a hub disc of a clutch disc of a motor vehicle friction clutch and the other main part is formed by two side discs connected with one another into a unit and arranged axially on both sides of the hub disc, of which side discs, one is formed as an engaging disc and carries clutch friction linings and the other serves as a cover disc and wherein the first friction damper device connects the intermediate part with the engaging disc, and the first friction damper device, the friction torque of which is smaller than the friction torque of the second friction damper device, is arranged in parallel connection with the two main parts.

7. A torsional vibration damper according to claim 6, wherein the intermediate part comprises an intermediate disc rotatable in relation to the hub disc and the engaging disc, said intermediate disc being arranged axially between the hub disc and the cover disc, and wherein the second friction damper device is arranged in the region of the cover disc adjacent to the rotation axis and co-operates with the intermediate disc and the cover disc.

8. A torsional vibration damper according to claim 7, wherein the first friction damper device which acts between the engaging disc and the hub disc is arranged on the side of the hub disc axially opposite to the second friction damper device.

9. A torsional vibration damper comprising
   (a) two main parts (1, 3) rotatable in relation to one another about a common axis of rotation,
   (b) at least one pair of springs (7, 9) arranged in series - connection with one another and coupled said two main parts (1, 3) rotationally elastically with one another,
   (c) a friction damper device ($R_2$) stressable during the relative rotation of said two parts (1, 3),
   (d) an intermediate part (5) rotatable about the common rotation axis relative to said two main parts (1, 3) and said springs (7, 9) of the pair are supported on one another during the relative rotation of said two main parts (1, 3), said intermediate part (5) is coupled with one (3) of said two main parts (1, 3) by the parallel connection of said friction damper device ($R_2$) and with one (9) of said two springs (7, 9) of said pair and is coupled with the other (1) of said two main parts (1, 3) only by means of the other (7) of said two springs (7, 9) of said pair, (e) one of the two main parts comprises a hub disc and the other of the two main parts comprises two side discs arranged axially on both sides of the hub disc and and connected with one another to form one unit, wherein the intermediate part comprises at least one intermediate disc arranged axially between the hub disc and one of the side discs and rotatable in relation to the hub disc and the side discs, wherein the springs of the spring pair are seated in the circumferential direction one behind the other in common windows of the hub disc and of the side discs and wherein the intermediate disc comprises at least one engaging part grasping between the springs of the spring pair, (f) the intermediate part comprises two intermediate discs arranged on axially opposite sides of the hub disc and wherein the engaging part passes through the window of the hub disc between the springs of the spring pair and connects the two intermediate discs and the engaging part secures the intermediate discs to one another.

* * * * *